United States Patent [19]

Berg

[11] Patent Number: 4,487,591
[45] Date of Patent: Dec. 11, 1984

[54] FLEXIBLE COUPLING

[75] Inventor: Dennis G. Berg, East Rockaway, N.Y.

[73] Assignee: Winfred M. Berg, Inc., East Rockaway, N.Y.

[21] Appl. No.: 36,140

[22] Filed: May 4, 1979

Related U.S. Application Data

[63] Continuation of Ser. No. 686,012, May 13, 1976, abandoned, which is a continuation of Ser. No. 493,466, Jul. 31, 1974, abandoned.

[51] Int. Cl.³ .............................................. F16D 3/00
[52] U.S. Cl. .................................... 464/85; 464/87; 464/137
[58] Field of Search ............... 64/10, 11 F, 19, 20, 64/12, 11 R, 15 B, 27 B, 27 NM; 464/85, 81, 87, 137

[56] References Cited

U.S. PATENT DOCUMENTS

| | | | |
|---|---|---|---|
| 1,513,944 | 11/1924 | Stephenson | 64/15 C |
| 1,834,521 | 12/1931 | Froussard | 64/11 F |
| 2,696,719 | 12/1954 | Sklar | 64/10 |
| 3,019,622 | 2/1962 | Fermier | 64/15 B |
| 3,304,743 | 2/1967 | Paulsen | 64/11 R |

FOREIGN PATENT DOCUMENTS 918906 10/1954 Fed. Rep. of Germany ...... 64/11 F Primary Examiner—Magdalen Y. C. Moy
Attorney, Agent, or Firm—Stoll, Wilkie, Previto & Hoffman

[57] ABSTRACT

This invention relates to couplings such as universal joints and the like for coupling the ends of two shafts together and, in particular, in situations where the two shafts may be in either lateral, longitudinal or angular misalignment. The coupling comprises flexible finger means which connect in sliding relationship to finger receiving means on hubs adapted to be connected to the shafts.

4 Claims, 6 Drawing Figures

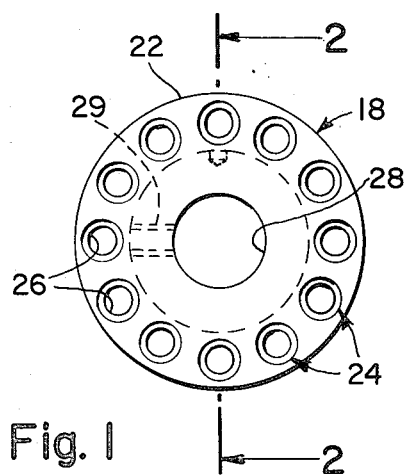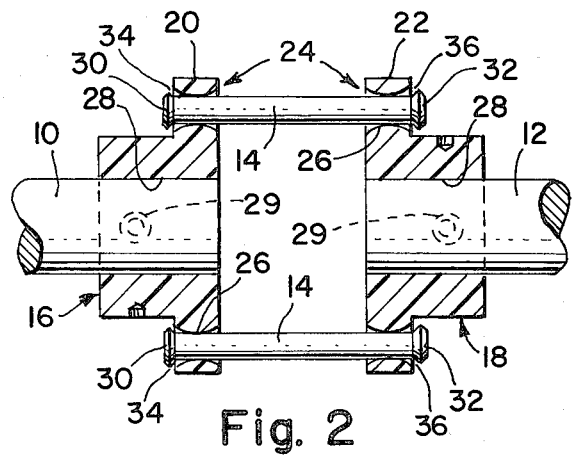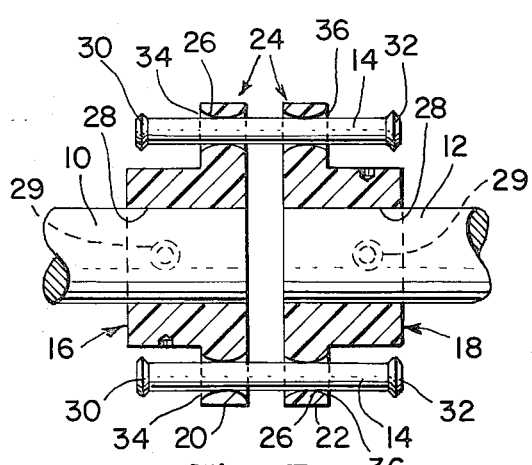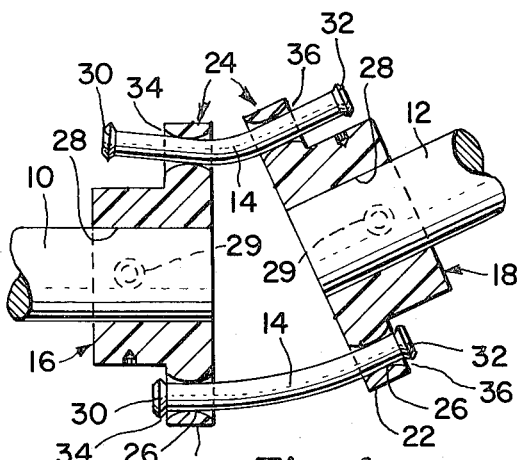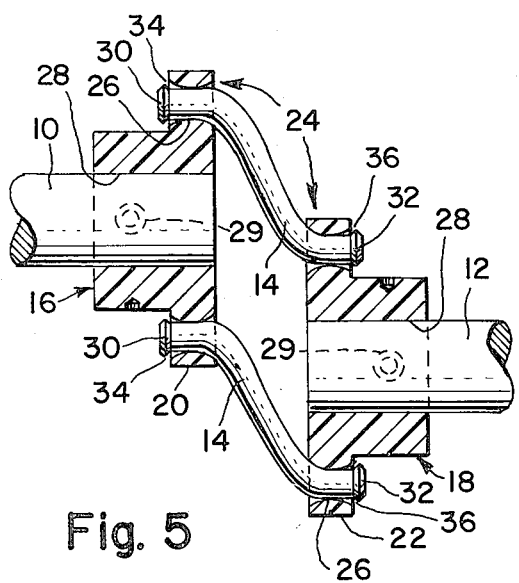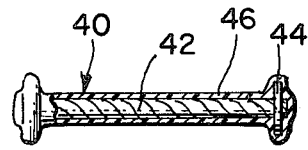

FLEXIBLE COUPLING

This is a continuation of application Ser. No. 686,012 filed May 13, 1976 now abandoned, which is a continuation of Ser. No. 493,466 filed July 31, 1974 now abandoned.

BACKGROUND OF THE INVENTION

Couplings for shafts having angular misalignment, such as universal joints and other such couplings, are well known in the art. In this invention a flexible coupling is provided for joining shafts, not only with angular misalignment, but also lateral misalignment and which provide for longitudinal adjustment of shaft movement, all automatically and simultaneously.

It is also an object of the invention to provide such a flexible coupling which may be manufactured economically and which may be fitted easily. It is another object of the invention to provide a flexible coupling of the type described made of plastic components to achieve a silent drive without a metal to metal contact. It is a further object of the invention to provide such a coupling which will not need lubrication. Further objects and advantages will appear in the specification hereinbelow.

BRIEF DESCRIPTION OF THE DRAWINGS

FIG. 1 is an end elevational view of a hub 18 of the invention;

FIG. 2 is a sectional view along the lines 2—2 of FIG. 1 including additional elements such as another hub 16 and fingers 14 of the invention and shafts 10 and 12 with parts cut away;

FIG. 3 is a view similar to FIG. 2 showing the invention in a different position;

FIG. 4 is a view similar to FIG. 2 showing the invention in an angular misalignment;

FIG. 5 is a view similar to FIG. 2 showing the invention in a lateral offset misalignment; and FIG. 6 is an elevational view showing an alternate of sliding finger of the invention with parts cut away.

Similar numerals refer to similar parts throughout the several views.

DETAILED DESCRIPTION OF THE INVENTION

The invention is provided to couple a pair of shafts such as shafts 10 and 12. The shafts 10 and 12 may be drive shafts or driven shafts, respectively, or they may be idler shafts, or any other type of rotary shaft which needs coupling longitudinally to another shaft along generally the axis of the shafts. In some applications the shafts 10 and 12 will be misaligned angularly as shown in FIG. 4, and in some applications the shafts 10 and 12 will be misaligned laterally, as shown in FIG. 5, and in some applications a shaft combination, such as shafts 10 and 12, may be aligned longitudinally but because of the operation of the installation in which they are contained, one or both of the shafts may move longitudinally requiring a coupling which will allow for sliding action of the shafts toward and away from each other. Such an application is illustrated by viewing FIGS. 2 and 3. In FIG. 2 the shafts 10 and 12 are spaced apart to the extent permitted by the length of the fingers 14. In FIG. 3 the shafts are closer together with their hubs 16 and 18 more toward the centers of the fingers 14. Thus the coupling provides for longitudinal sliding of the shafts 10 and 12 and their hubs 16 and 18 along the length of the fingers 14. FIGS. 2 and 3 are used to illustrate how the shafts may slide longitudinally with the hubs 16 and 18 farther apart, as in FIG. 2, to a position with the hubs closer together, as shown in FIG. 3. Such an action can be found in a mechanism where one or both of the shafts may be reciprocated by another part of the mechanism not shown.

The same FIGS. 2 and 3 are also used to illustrate how the coupling of the invention may be used, if desired, to connect two shafts such as 10 and 12 in fixed non-sliding longitudinal alignment. For example, shafts 10 and 12, as shown in FIG. 2, would remain in fixed position and the length of the fingers of the coupling would complete the joint. Again, as in FIG. 3, the shafts 10 and 12 would be fixed in a position closer to each other, and here again the fingers of the coupling would nevertheless serve to couple the joint with the shafts 10 and 12 in such closer position. In either case, whether the shafts 10 and 12 are reciprocated or not during their rotation, the coupling of the invention will serve to make a joint to transmit the power between them. This can be done in a new installation or in a situation where a broken shaft may be replaced with a shaft of a different length as a permanent or temporary repair.

It is a feature of this invention that the same coupling arrangement provides for operation between a pair of shafts having all of the above described misalignments and slidings. For example, a coupling of the invention provided for use with a shaft requiring a hub with a one-quarter inch bore can be used to couple two such shafts in any of the misalignments depicted in the drawings and will also accommodate two such shafts having a combination of such misalignments. In addition, two shafts of different diameters requiring hubs of different bores may also be jointed by the coupling of the invention.

The coupling is constructed as follows. There are a pair of hubs 16 and 18 which are identical except that they are made in left and right hand relationship. Each hub comprises a ring 20 and 22, respectively, and each ring comprises a plurality of finger seat means 24. The finger seats 24 are fashioned through the rings 20 and 22 and are provided with curved walls 26, each of which has a central bore 28 and set screw fastener 29, or other means to fasten it to its shaft 10 or 12. The hubs 16 and 18 are connected by at least one flexible finger 14 which comprises a body portion of engineered plastic with a durometer of hardness to suit the desired load of the operation. Flexible polyurethane or equal material is preferred.

The requirement for the fingers 14 is that they be flexible enough to bend with the coupling and strong enough to maintain the drive or the connection. In the preferred form each finger 14 has heads 30 and 32 which are larger in diameter than the openings 34 and 36 in the rings 20 and 22, respectively. The heads 30 and 32 (or ends) of the fingers 14 should be wide enough to prevent the fingers from sliding through the finger seat means 24. This feature has been described in the preferred form. However any other means of preventing unseating of the fingers can be employed. For example, thickening the ends of the fingers so that they cannot pass through the narrowest portion of the through bores 28.

The diameter of the fingers 14 are such that they fit in slidable relationship within the curved walls 26 of the finger seats 24. The preferred curve of wall 26, as illustrated in the drawings, permits the fingers to slide and flex with a minimum of friction and wear to the material of the fingers. The curve may vary to suit.

FIGS. 2, 3, 4 and 5 illustrate the various misalignments and parallel drives which the invention may provide in its coupling connection. As has been stated above, FIGS. 2 and 3 illustrate the sliding which could be accompanying an oscillating type of drive which would result in a reciprocating motion of either one or both of the shafts 10 and 12 in a longitudinal direction. FIG. 4 illustrates an angle drive which is commonly found with the universal joints known to the art, and FIG. 5 represents a lateral misalignment or parallel drive which may be necessitated in a device. In any of the drives the coupling of the invention is adapted to provide for transmission of the drive through the coupling no matter what type of misalignment or reciprocation is involved.

The heads 30 and 32 of the fingers 14 may be made of molded material molded integrally with the fingers 14 or they may be added by any other process known to the art and of any other material suitable for their intended use as stops to prevent the fingers 14 from going through the finger seats 24.

In FIG. 6 an alternate form of finger 40 is shown which comprises a main body portion made of twisted cable such as steel cable or aluminum cable, or the like, 42 to which a metallic washer is welded. A pair of washers 44 are welded to the ends of finger 40 directly to the cable 42 and serve as heads for the fingers in the same manner as heads 30 and 32 function. Finger 40 is completed with a plastic coating 46 of polyurethane, or equal material. The hubs 16 and 18 may be steel or aluminum machined or molded plastic. The coupling can be adapted to a variety of sizes and will run at large angles of misalignment. A coupling arrangement of the invention will absorb end play, will be quiet running, maintenance free, non-conductive and will require no lubrication. It is simple to assemble. The hubs if made of metal may be machined and the fingers may be molded or extruded or may be made of any process.

The invention therefore provides for shaft to shaft coupling, shaft to shaft misalignment, angular misalignment, lateral misalignment, reciprocating motions, pin to pin phasing or timing, and serves as a universal joint. There are no loose parts, it is silent in its application and works with a minimum of friction to provide a positive drive and is acid and chemical resistant.

The number of sliding fingers 14 can be varied in quantity to suit the drive load requirements. The cross section diameter of the fingers and the physical length can also be varied. The sliding fingers 14 may be made of solid or tubular material as desired. While I have stated that flexible polyurethane is a preferred material for the fingers, flexible nylon and the plastic jacketed or plain flexible cable will also serve.

While I have described my invention in its preferred form, there are other forms which it may take without departing from the spirit and scope of the invention and I therefore desire to be protected for all forms coming within the claims below.

Wherefore I claim:

1. A flexible coupling for connecting a pair of shafts comprising the combination of a first hub on the end of one shaft, a second hub on the end of the second shaft, said hubs being similar and each of said hubs having a ring-like flange with a plurality of equally spaced finger seating apertures therein with curved walls; a plurality of flexible plastic fingers with each one extending through a finger seating aperture in one hub and through an opposite finger seating aperture in the other hub and being in sliding engagement with the walls of both apertures, and similar projecting heads on the opposite ends of each finger whereby the hubs are permitted to slide inwardly of the fingers toward each other between the projecting finger heads.

2. The flexible coupling as claimed in claim 1 in which the fingers are hollow.

3. The flexible coupling as claimed in claim 1 in which the fingers are solid.

4. The flexible coupling as claimed in claim 1, in which the fingers include a flexible twisted cable case.

* * * * *